(12) United States Patent
Kim et al.

(10) Patent No.: US 8,568,841 B2
(45) Date of Patent: Oct. 29, 2013

(54) THERMO-SHRINKABLE POLYESTER FILM

(75) Inventors: Yun Jo Kim, Gumi-si (KR); Chan Seok Yoon, Busan (KR); Si Min Kim, Dalseo-gu (KR)

(73) Assignee: Kolon Industries, Inc., Gwacheon-si (KR)

( * ) Notice: Subject to any disclaimer, the term of this patent is extended or adjusted under 35 U.S.C. 154(b) by 460 days.

(21) Appl. No.: 12/747,416

(22) PCT Filed: Dec. 11, 2008

(86) PCT No.: PCT/KR2008/007336
§ 371 (c)(1),
(2), (4) Date: Sep. 13, 2010

(87) PCT Pub. No.: WO2009/075533
PCT Pub. Date: Jun. 18, 2009

(65) Prior Publication Data
US 2010/0331513 A1    Dec. 30, 2010

(30) Foreign Application Priority Data
Dec. 11, 2007  (KR) .................. 10-2007-0128371

(51) Int. Cl.
| | |
|---|---|
| *B32B 27/36* | (2006.01) |
| *C08G 63/12* | (2006.01) |
| *C08G 63/123* | (2006.01) |
| *C08G 63/127* | (2006.01) |
| *C08G 63/13* | (2006.01) |
| *C08G 63/16* | (2006.01) |
| *C08G 63/18* | (2006.01) |
| *C08G 63/181* | (2006.01) |
| *C08G 63/183* | (2006.01) |
| *C08G 63/187* | (2006.01) |
| *C08G 63/189* | (2006.01) |

(52) U.S. Cl.
USPC ......... 428/35.1; 428/34.9; 428/480; 428/910; 528/302; 528/305; 528/306; 528/308; 528/308.1; 528/308.6; 528/308.7

(58) Field of Classification Search
None
See application file for complete search history.

(56) References Cited

U.S. PATENT DOCUMENTS

| | | | | |
|---|---|---|---|---|
| 4,985,538 | A  * | 1/1991 | Fukuda et al. ................. | 528/305 |
| 5,985,387 | A  * | 11/1999 | Mori et al. ..................... | 428/34.9 |
| 6,362,306 | B1 * | 3/2002 | Shelby et al. ................. | 528/308.7 |
| 6,451,445 | B1 * | 9/2002 | Ito et al. ........................ | 428/480 |
| 6,548,595 | B2 * | 4/2003 | Ito et al. ........................ | 524/599 |
| 6,599,994 | B2 * | 7/2003 | Shelby et al. ................. | 525/444 |
| 6,610,392 | B1 * | 8/2003 | Ramesh et al. ............... | 428/213 |
| 6,958,178 | B2 * | 10/2005 | Hayakawa et al. .......... | 428/34.9 |
| 7,128,863 | B2 * | 10/2006 | Kim et al. .................... | 264/210.8 |
| 7,303,812 | B2 * | 12/2007 | Hashimoto et al. ......... | 428/318.6 |
| 7,306,835 | B2 * | 12/2007 | Hong et al. .................. | 428/35.1 |
| 7,829,655 | B2 * | 11/2010 | Endo et al. ................... | 528/308.1 |
| 8,206,797 | B2 * | 6/2012 | Haruta et al. ................. | 428/35.1 |
| 2004/0180229 | A1 * | 9/2004 | Hayakawa et al. .......... | 428/480 |

FOREIGN PATENT DOCUMENTS

| | | | |
|---|---|---|---|
| GB | 1 475 377 A | | 6/1977 |
| JP | 06-114934 | * | 4/1994 |
| JP | 2002-331581 A | | 11/2002 |
| JP | 2003-105106 A | | 4/2003 |
| KR | 2000-0076618 A | | 12/2000 |
| KR | 2001-0098819 A | | 11/2001 |
| KR | 10-2003-0053508 A | | 6/2003 |
| KR | 10-2005-0000141 A | | 1/2005 |
| KR | 10-2003-0098619 | * | 11/2005 |
| KR | 10-2007-0078730 A | | 8/2007 |
| WO | WO 2005/123814 | * | 12/2005 |

* cited by examiner

*Primary Examiner* — Vivian Chen
(74) *Attorney, Agent, or Firm* — Sughrue Mion, PLLC

(57) ABSTRACT

Disclosed is a thermo-shrinkable polyester film having superior thermal shrinkage properties. The thermo-shrinkable polyester film has a strength of 3.5~6.5 kg/mm² in a direction perpendicular to a main shrinking direction at an initial elongation less than 10%, an elongation at rupture of 50~700% in a direction perpendicular to a main shrinking direction, a thickness uniformity (ΔR) of 4 or less and a shrinkage ratio of 5% or less in a direction perpendicular to a main shrinking direction, thus preventing the rupture thereof in a rolling process and so on and ensuring process stability and productivity.

8 Claims, No Drawings

THERMO-SHRINKABLE POLYESTER FILM

TECHNICAL FIELD

The present invention relates to a thermo-shrinkable polyester film having superior thermal shrinkage properties.

BACKGROUND ART

A thermo-shrinkable film is used for packing material or labels for coating, binding or wrapping various containers including bottles, cans or the like, and longish objects including pipes, rods and so on, and is composed mainly of polyester.

A thermo-shrinkable film is employed for shrink (accumulative) packaging, shrink labeling and cap sealing various containers including, for example, polyethyleneterephthalte (PET) containers, polyethylene containers, glass containers and so on, using the heat shrinkability thereof.

In order to manufacture a label or the like, polymer material is continuously melted and extruded, thus preparing an unstretched film, which is then stretched to give a thermo-shrinkable film roll. The film in the roll is unwound, slit into a desired width, and then rewound into another roll. Subsequently, various characters and figures, including a product name and the like, are printed on the resulting film. After the completion of printing, the film is folded and bonded along both edges by means of, for example, solvent adhesion, to give a tubular film (in a tubing process). As such, there are cases where the order of performing the slitting process and the printing process is reversed. The tubular film thus obtained may be rewound into a roll and then unwound in subsequent procedures so that it is cut into tubular labels of a desired length, which are then further converted into bags through bonding along an edge of one opening thereof.

Subsequently, a container is clothed in the label or bag, passed, for example on a belt conveyer, through a shrinking tunnel (steam tunnel) wherein heated steam is blown causing thermal shrinkage or a shrinking tunnel (hot-air tunnel) wherein hot air is blown, to give a final product (a labeled container) having the label or bag tightly attached thereto.

However, all of the slitting process, the printing process, the rewinding process, and the unwinding process of the preparation of the label or bag are accompanied by a predetermined tension, and, in particular, in the process of unwinding the film or tubular film from the roll, the film or tubular film may be intermittently subjected to an intensive tension and thus may be strained.

In this case, the rupture of the thermo-shrinkable film may occur frequently, and such rupture is generated in film manufacturers and post-process companies of the film, for example, printers or final container manufacturers, resulting in increased defect rates of products and reduced productivity.

Also, in the printing process, non-uniform printing may occur frequently, consequently increasing the defect rates of products and deteriorating the external appearance of final products.

DISCLOSURE

Technical Problem

Accordingly, the present invention provides a thermo-shrinkable film, which is stable against the film rupture occurring in processes accompanied by a predetermined tension during any of the processes of film preparation, printing, slitting and container manufacturing.

In addition, the present invention provides a thermo-shrinkable film, which is stable against the film rupture occurring in processes accompanied by a predetermined tension during any of the processes of film preparation, printing, slitting and container manufacturing, and also is capable of ensuring printing uniformity.

Technical Solution

According to an embodiment of the present invention, a thermo-shrinkable polyester film has a strength of 3.5~6.5 $kg/mm^2$ in a direction perpendicular to a main shrinking direction at an initial elongation less than 10%, an elongation at rupture of 50~700% in the direction perpendicular to the main shrinking direction, a thickness uniformity ($\Delta R$) of 4 or less and a shrinkage ratio of 5% or less in the direction perpendicular to the main shrinking direction.

The thermo-shrinkable polyester film according to the embodiment of the present invention may have a shrinkage ratio of 40% or more in the main shrinking direction in hot water at 95° C., and an elongation at rupture of 60~120% in the main shrinking direction.

According to an exemplary embodiment of the present invention, the thermo-shrinkable polyester film may include at least one copolyester selected from among copolyesters prepared from a dicarboxylic acid component including one or more selected from among dicarboxylic acids including terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and from a diol component including one or more selected from among diols including ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol; or a mixture of homopolyester and copolyester.

The copolyester may include a dicarboxylic acid monomer including 80 mol % or more of a terephthalic acid monomer and a diol monomer including 60 mol % or more of an ethyleneglycol monomer.

The copolyester may have a glass transition temperature of 67~77° C. and an intrinsic viscosity of 0.60~0.75 dl/g. The homopolyester may be polybutyleneterephthalate or polytriethylene terephthalate.

The polybutyleneterephthalate may be used in an amount of 7~15 wt % based on a total amount of the polyester.

The thermo-shrinkable polyester film may be manufactured by subjecting the polyester to extrusion, being stretched in a machine direction (MD) at a natural stretch ratio naturally occurring in MD plus an additional 0.1~5% and then being stretched in a transverse direction (TD).

According to another embodiment of the present invention, a method of manufacturing the thermo-shrinkable polyester film through extrusion and stretching of polyester includes extruding polyester at 200~350° C. so that a shear rate of a polymer is 100~500 $sec^{-1}$, thus obtaining an extruded polyester sheet; stretching the extruded polyester sheet in MD at a natural stretch ratio naturally occurring in MD plus an additional 0.1~5%; and stretching the polyester sheet in TD, wherein the thermo-shrinkable polyester film has a strength of 3.5~6.5 $kg/mm^2$ in a direction perpendicular to a main shrinking direction at an initial elongation within 10%, an elongation at rupture of 50~700% in the direction perpendicular to the main shrinking direction, a thickness uniformity (ΔR) of 4 or less and a shrinkage ratio of 5% or less in the direction perpendicular to the main shrinking direction.

ADVANTAGEOUS EFFECTS

According to the present invention, a shrinkable film can be prevented from rupturing during a rolling process which is accompanied by a predetermined tension upon manufacture and use of the film during the processes of film preparation, printing, slitting, processing into a label or bag and so on, thus increasing product reliability and ensuring process stability and productivity.

BEST MODE

Hereinafter, a detailed description will be given of the present invention.

A shrinkable film is manufactured based on a principle in which low-temperature uniaxial stretching permits maximum uniaxial orientation and also relief of residual stress due to heat treatment is prevented so that a uniaxially oriented molecular chain retains such residual stress and then is shrunk by the force of the residual stress in the shrinking process which is finally performed. From this point of view, thorough research and development into a shrinkage ratio of thermo-shrinkable films in a film direction, namely, a main shrinking direction, for example, a transverse direction (TD), for thermo-shrinkable films which are mainly shrunken in a final shrinking process has been conducted.

However, it was found that the rupture of the film which occurs in the processes of film preparation, printing, slitting, winding of tubular film, and unwinding is dependant not on a shrinkage ratio in a main shrinking direction but on strength, elongation at rupture and thickness uniformity (ΔR) in a direction perpendicular to the main shrinking direction, for example, a machine direction (MD).

Thus, according to an embodiment of the present invention, a thermo-shrinkable polyester film has a strength of 3.5~6.5 kg/mm$^2$ in a direction perpendicular to a main shrinking direction at an initial elongation less than 10%, an elongation at rupture of 50~700% in a direction perpendicular to a main shrinking direction, a thickness uniformity (ΔR) of 4 or less and a shrinkage ratio of 5% or less in a direction perpendicular to a main shrinking direction.

If the thermo-shrinkable polyester film has a strength below 3.5 kg/mm$^2$ in a direction perpendicular to a main shrinking direction at an initial elongation less than 10%, an elongation at rupture below 50%, or a thickness uniformity (ΔR) above 4, the film may rupture during any of the film preparation process, the process of unwinding the film in the roll for printing, the slitting process, the process of winding the tubular film and the unwinding process for preparation of the film into the label or bag.

Thus, the case where the strength in a direction perpendicular to a main shrinking direction at an initial elongation less than 10% is 3.5 kg/mm$^2$ or more is preferable in terms of preventing the rupture of the film. In consideration of the slitting or the cutting of the tubular film for preparation into the label or bag, the strength of 3.5~6.5 kg/mm$^2$ in MD at an initial elongation less than 10% is more preferable.

Also, in the case where the elongation at rupture in a direction perpendicular to a main shrinking direction is below 50%, the film cannot absorb a tension given thereto in the process, and thus may rupture during the process. When the elongation at rupture is above 700%, the deformation in the length of the film may easily occur upon even small changes in tension, and thus the shape thereof is deformed, undesirably causing poor printing and extension, resulting in reduced processability. Hence, the elongation at rupture of 50~700% in MD is preferable.

The thermo-shrinkable polyester film according to the present invention preferably has a thickness uniformity (ΔR) of 4 or less so as to ensure not rupturing hence process stability and to achieve printing uniformity upon printing. Herein, the thickness uniformity (ΔR) may be measured using a thickness gauge (GS551, available from Ono Sokki). If the thickness uniformity (ΔR) exceeds 4, it is difficult to achieve uniform printing during the process of unwinding the film in the roll. This factor is considered to be necessary for preventing the rupture of the film and ensuring process stability.

While satisfying these properties, the thermo-shrinkable polyester film according to the present invention may have a shrinkage ratio of 40% or more in a main shrinking direction in hot water at 95. In the case where the film has a shape which does not need excessive shrinkage, a shrinkage ratio of about 50% is adequate. In the case where the film has a curved shape and thus needs high shrinkage, the shrinkage ratio of about 75% or more may be adequate.

Also, in the thermo-shrinkable polyester film according to the present invention, a modulus is regarded as important from the point of view of minimizing the deformation in length of the film with respect to external stress in order to prevent the deformation of a printed label due to shrinkage stress occurring during a shrinking process. As one factor representing it, the elongation at rupture in a main shrinking direction may range from 60% to 120%.

The thermo-shrinkable polyester film according to the present invention satisfying the above film properties may be obtained from at least one copolyester selected from among copolyesters prepared from a dicarboxylic acid component including one or more selected from among known dicarboxylic acids such as terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and from a diol component including one or more selected from among known diols such as ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol; or a mixture of homopolyester and copolyester.

As such, the copolyester may be composed of a dicarboxylic acid monomer including 80 mol % or more of a terephthalic acid monomer and a diol monomer including 14~24 mol % of a monomer other than ethyleneglycol.

In the present invention, the copolyester itself may be prepared through a typical polyester preparation process. Examples of the polyester preparation process may include direct esterification including direct reaction of diol to dicarboxylic acid, and transesterification including reaction of diol to dimethylester of dicarboxylic acid.

According to the embodiment of the present invention, copolyester has a glass transition temperature of 67~77 and an intrinsic viscosity of 0.60~0.75 dl/g. As such, the glass transition temperature may be adjusted depending on the composition of the monomers used for the preparation of the polymer, and the intrinsic viscosity may vary depending on the degree of polymerization. So, in the present invention, copolyester satisfying the glass transition temperature and the intrinsic viscosity within the above ranges, adjusted as mentioned above, may be used.

The copolyester may be used alone or in combinations thereof, and may be mixed with homopolyester. Upon mixing, the copolyester may be used in an amount of 85~93 wt % based on the total amount of the polyester.

On the other hand, in the case of two or more types of polyester, namely, a polyester mixture, the amount of terephthalic acid may be 80 mol % or more based on the total amount of dicarboxylic acid monomer in the polyester mixture, and the amount of ethyleneglycol may be 60 mol % or more based on the total amount of diol monomer in the polyester mixture.

For example, in the present invention, homopolyester may include polybutyleneterephthalate, and the mixture of polybutyleneterephthalate and copolyester may be prepared into a film. As such, the amount of polybutyleneterephthalate may be set to 7~15 wt % based on the total amount of the polyester.

Typically, for commercial use of a shrinkable film, a solvent adhesion process for bonding a shrinkable film using a solvent is adopted. In this case, if the amount of polybutyleneterephthalate is too low, solvent adhesiveness is reduced and commercial use of the film may become difficult. In contrast, if the amount thereof is too high, the shrinkage ratio in TD (a main shrinking direction) may be lowered, and mechanical properties (strength and elongation) of the film in a direction (MD) perpendicular to a main shrinking direction may be deteriorated.

As the homopolyester, polytriethyleneterephthalate may be used instead of, or in addition to polybutyleneterephthalate.

Further, in order to improve sliding properties upon preparation of a film, a lubricant, for example, silicon dioxide, titanium dioxide, silica powder and calcium carbonate may be added, and various additives including an antistatic agent, an anti-aging agent, a UV protecting agent, and a dye may be added, if necessary.

The thermo-shrinkable polyester film having the above properties according to the present invention may be manufactured through the following procedures.

Material for the polyester film is typically dried in an oven and then extruded at 200~350. For extrusion, any known process for example T-die extrusion or tubular extrusion may be used. When flowability of the polymer is controlled upon extrusion, the thickness of the film becomes uniform. In consideration thereof, the extrusion conditions are adjusted so that the shear rate of the polymer to be extruded from a die is 100~500 sec$^{-1}$, thus uniformly controlling the flowability of the polymer.

If the shear rate upon extrusion is below 100 sec$^{-1}$, miscibility of the polymer is decreased and flowability of the polymer is not efficient upon extrusion of the polymer from the die. Further, the thickness uniformity is reduced due to die swelling. In contrast, if the shear rate exceeds 500 sec$^{-1}$, fluctuation of the polymer occurs upon extrusion due to the reduction in tension, undesirably lowering the thickness uniformity.

The extruded product is rapidly cooled using an electrostatic charge contact process or the like, thus obtaining an unstretched film.

Although the unstretched film is typically passed through a stretching zone in MD depending on a natural stretch ratio in MD, stretching may be further performed at an additional stretch ratio of about 0.1~5% in addition to the natural stretch ratio, in order to improve the properties of the film in MD, namely, a direction perpendicular to a main shrinking direction. Such additional stretching in MD may enhance polymeric chain entanglement in MD, thus improving the properties of the film in MD.

Also, the film thus stretched at a predetermined ratio in MD may be stretched in TD. In this case, the stretching temperature may range from (glass transition temperature (Tg) of polyester−10° C.) to (Tg of polyester+30° C.). Low-temperature stretching close to the Tg of polyester may be performed.

If the stretching temperature is too low, the film is not stretched and thus may rupture or may result in non-uniform stretching. In contrast, if the stretching temperature is too high, the shrinkage ratio may be reduced. So, the stretching temperature may be set in the range from (Tg of polyester−10° C.) to (Tg of polyester+30° C.).

In the case where the stretch ratio of the shrinkable film is low, the shrinkage ratio may be reduced. In contrast, in the case where the stretch ratio of the shrinkable film is too high, the film may rupture or it is difficult to expect an improvement in the properties thereof, thus providing no effect of the increase in the stretch ratio. Therefore, the stretch ratio may be set in the range of about 3.0~5.0 times the original length of the film.

The stretching may be performed using a typical device, and roll stretching, tenter stretching or tubular stretching may be applied.

After the stretching process, heat treatment is not performed, or may be performed at a temperature not higher than Tg+30° C. within about 20 sec.

When the thermo-shrinkable polyester film thus obtained has a melting peak temperature (Tm) of 190~210° C. and an intrinsic viscosity of 0.60~0.72 dl/g, it may satisfy the above film properties.

In particular, the melting peak temperature and the intrinsic viscosity of the film prepared from the material resin, namely, the copolyester, having the Tg and the intrinsic viscosity as above may satisfy the above range.

The melting peak temperature of the film may depend on the stretching conditions related to the properties of the material resin and the Tg of the resin, but the intrinsic viscosity of the film may be different from the intrinsic viscosity of the material resin depending on the extrusion conditions. In consideration of the thermal shrinkage properties, the extrusion conditions are adjusted, and thus the intrinsic viscosity of the film may be controlled within the above range.

Specifically, when the intrinsic viscosity of the film is decreased, the probability in which a relatively short molecular chain is present is increased. Upon processing, when a tensile force is given to the film, the short molecular chain has chain entanglement smaller than a long molecular chain, and thus it is easy to generate slipping between the molecular chains, consequently deteriorating the mechanical properties of the film.

Hence, in order to satisfy the properties of the shrinkable film, the intrinsic viscosity of the film should be at least 0.5 dl/g.

On the other hand, when the intrinsic viscosity of the film is increased, the mechanical properties of the film may become good. However, in order to increase the intrinsic viscosity of the film, because the intrinsic viscosity of a material composition should be high, problems occurring during processing may ensue. Accordingly, in consideration thereof, the intrinsic viscosity may be increased up to a predetermined level.

MODE FOR INVENTION

A better understanding of the present invention may be obtained through the following examples, which are set forth to illustrate, but are not to be construed as limiting the present invention.

The evaluation items used in the present invention are as follows.

(1) Intrinsic Viscosity (IV)

200 mg of a sample was added to 20 ml of a 50/50 solvent admixture of phenol and tetrachloroethane, after which the resulting mixture was heated to about 110° C. for 1 hour and then the intrinsic viscosity thereof was measured at 30° C.

(2) Glass Transition Temperature (Tg) and Melting Peak Temperature (Tm)

A sample was heated at a rate of 20° C./min using DSC-7 available from Perkin-Elmer Corp., and the glass transition temperature and the melting peak temperature thereof were measured.

(3) Thermal Shrinkage Ratio

A film was cut into a square having a size of 20 cm×20 cm, thermally shrunk in hot water at 95° C.+0.5° C. under no load for 10 sec, after which the numerical values of the film in MD (the direction perpendicular to a main shrinking direction) and TD (a main shrinking direction) were measured and then substituted into Equation 1 below, thus determining the thermal shrinkage ratio.

$$\text{Thermal Shrinkage Ratio} = \left(\frac{\text{length before shrinkage} - \text{length after shrinkage}}{\text{length before shrinkage}}\right) \times 100 \quad \text{Equation 1}$$

(4) Strength in Direction Perpendicular to Main Shrinking Direction at Initial Elongation less than 10%

The tensile properties of a film in MD (a direction perpendicular to a main shrinking direction) were measured using a tensile test machine available from Instron under conditions of a width of 15 mm (in TD, namely, a main shrinking direction), a gauge length of 50 mm (in a direction perpendicular to a main shrinking direction), and a cross head-up speed of 500 mm/min.

From the measurement result, the maximum tensile strength was determined in the range of initial elongation less than 10%, thus determining the strength in a direction perpendicular to a main shrinking direction at an initial elongation within 10% corresponding to an initial mechanical strength of the film.

(5) Elongation at Rupture of Film

The tensile properties of a film were measured using a tensile test machine available from Instron under conditions of a width of 15 mm (in TD, namely, a main shrinking direction), a gauge length of 50 mm (in a direction perpendicular to a main shrinking direction), and a cross head-up speed of 500 mm/min.

The elongation was measured at the moment of the rupture of the film, thus determining the elongation at rupture in a direction perpendicular to a main shrinking direction.

The elongation at rupture in a main shrinking direction was determined in the same manner as above under conditions in which the gauge length was set in a main shrinking direction and the width was set in a direction perpendicular to the main shrinking direction.

(6) Thickness Uniformity of Film

Before slitting a film to a predetermined width, a film with a width which was the entirety of the width was taken off from a jumbo roll or winder mill roll having a stretched wide width, and three sheets thereof were laminated. The thickness values of the film were measured along the overall width of the film at distance intervals of 3.5 cm from a left side toward a right side with the exception of a region with width of 10 cm at each of both lateral sides of the overall width of the film using a contact type thickness gauge (GS551, available from Ono Sokki). The thickness uniformly was determined using Equation 2 below.

$$\text{Thickness Uniformity } (\Delta R) = (\text{Maximum Thickness} - \text{Minimum Thickness})/3 \quad \text{Equation 2}$$

(7) Rupture Generation of Film

A film having a width of 520 mm and a length of 2000 m was subjected to 8-color printing, slit to a width of 173.3 mm, wound by 2000 m each, and then solvent adhered, thus manufacturing six labels each having a width of 148 mm and a length of 1000 m, resulting in a total length of 6000 m. The frequency of rupture generated in the manufacture of the label was observed, and the rupture generation was determined using Equation 3 below.

$$\text{Rupture Generation (Frequency/1000 m)} = \text{Frequency of Rupture}/6000\text{ m} \quad \text{Equation 3}$$

(8) Printing Uniformity of Film

A figure was printed on the shrinkable film, and the film was bonded along edges thereof using a solvent, thus preparing a label, after which a container clothed in the label was passed through a steam type shrinking tunnel, thus obtaining a final product (a labeled container). The number of defects, due to a poorly printed state, was counted, thus evaluating printing uniformity.

The steam tunnel having a length of 1.5 m was provided with four steam blowers 1.2 m long which are positioned at upper and lower levels of both sides of the tunnel to blow steam so as to shrink the label of the container passed therethrough. As such, pressure was set to 0.2 bar, so that steam was blown. The steam tunnel was provided with a temperature controller and a heater so as to adjust the temperature of steam at the inlet and outlet of the tunnel. The inlet temperature was set to 77 and the outlet temperature was set to 86. The label was shrunk in the tunnel within the retention time of 5 sec which was the retention time used for the container clothed in the label, and thus the number of defects due to a defective external appearance of a final product (the labeled container) and a poorly printed state was counted, thus evaluating printing uniformity.

1000 samples were prepared, and the ratio of normal products defined as printing uniformity was determined by Equation 4 below.

$$\text{Shrinkage Uniformity} = \left(\frac{1000 - \text{number of defects}}{1000}\right) \times 100(\%) \quad \text{Equation 4}$$

EXAMPLE 1

100 mol % of terephthalic acid as a dibasic acid component, 100 mol % of ethyleneglycol and 24 mol % of neopentylglycol as glycol components, and 0.05 mol antimony trioxide (for the acid component) as a catalyst were polycondensed through direct esterification. The polymer thus obtained was mixed with 500 ppm silicon dioxide powder having an average particle size of 2.7 μm and then dried through a typical process, thus preparing copolyester having an intrinsic viscosity of 0.70 dl/g and a glass transition temperature of 74° C.

Separately, 100 mol % of terephthalic acid, 100 mol % of 1,4-butanediol, and 0.015 parts by weight of tetrabutyltitanate as a catalyst were polymerized, thus obtaining polybutyleneterephalate (intrinsic viscosity 0.97 dl/g, glass transition temperature 30° C.

90 wt % of the copolyester and 10 wt % of the polybutyleneterephalate were blended and extruded using an extruder at 265° C. after which a discharge amount, a width of a die from which the polymer was discharged and a lip gap were adjusted so that the shear rate of the polymer to be discharged was 420 sec$^{-1}$, followed by discharging the polymer. The discharged polymer was rapidly cooled and solidified, thus obtaining an unstretched film.

The unstretched film was stretched in MD at a stretch ratio of (natural stretch ratio+0.6%) in the course of passing it through a stretching roll having a natural stretch ratio of 3.4% in MD.

Then, the film was placed in a tenter and thus stretched 4.0 times the width thereof at 75° C. and then passed through a heat treatment zone at 80° C., thus manufacturing a thermo-shrinkable film having a thickness of 50 µm. The properties of the film are shown in Table 1 below.

EXAMPLE 2

An unstretched film obtained in the same manner as in Example 1 was used.

A thermo-shrinkable polyester film having a thickness of 50 µm was manufactured in the same manner as in Example 1, with the exception that the unstretched film was stretched in MD at a stretch ratio of (natural stretch ratio+4.5%) in the course of passing it through a stretching roll having a natural stretch ratio of 3.4% in MD.

The properties of the film are shown in Table 1 below.

EXAMPLE 3

A polyester blend obtained in the same manner as in Example 1 was used.

In the extrusion of the polyester blend, the discharge amount, the die width and the lip gap were adjusted so that the shear rate of the polymer to be discharged from the die was 140 sec$^{-1}$, thus controlling the flowability of the discharged polymer.

Then, the same subsequent procedures as in Example 1 were performed, thus manufacturing a thermo-shrinkable polyester film having a thickness of 50 µm.

The properties of the film are shown in Table 1 below.

EXAMPLE 4

An unstretched film obtained in the same manner as in Example 1 was used. The unstretched film was stretched in MD at a stretch ratio of (natural stretch ratio+0.6%) in the course of passing it through a stretching roll having a natural stretch ratio of 3.4% in MD, placed in a tenter and thus stretched 5.0 times the width thereof at 75° C. (stretching time 13.0 sec, length of stretching zone 9 m, stretching rate 41.4 m/min), and then passed through a heat treatment zone in the tenter without additional heating, thus obtaining a thermo-shrinkable polyester film having a thickness of 50 µm. The properties of the film are shown in Table 1 below.

EXAMPLE 5

100 mol % of terephthalic acid as a dibasic acid component, 104 mol % of ethyleneglycol and 20 mol % of neopentylglycol as glycol components, and 0.05 mol antimony trioxide (for the acid component) as a catalyst were polycondensed through direct esterification. The polymer thus obtained was mixed with 500 ppm silicon dioxide powder having an average particle size of 2.7 µm and then dried through a typical process, thus preparing copolyester having an intrinsic viscosity of 0.64 dl/g and a glass transition temperature of 76° C.

Separately, 100 mol % of terephthalic acid, 100 mol % of 1,4-butanediol, and 0.015 parts by weight of tetrabutyltitanate as a catalyst were polymerized, thus obtaining polybutyleneterephalate (intrinsic viscosity 0.97 dl/g, glass transition temperature 30° C.

90 wt % of the copolyester and 10 wt % of the polybutyleneterephalate were blended and extruded using an extruder at 265° C., after which the discharge amount, the width of the die from which the polymer was discharged and the lip gap were adjusted so that the shear rate of the polymer to be discharged was 420 sec$^{-1}$, followed by discharging the polymer. The discharged polymer was rapidly cooled and solidified, thus obtaining an unstretched film.

The unstretched film thus obtained was subjected to the same subsequent processes as in Example 1, thus manufacturing a thermo-shrinkable film having a thickness of 50 µm.

The properties of the film are shown in Table 1 below.

Comparative Example 1

A thermo-shrinkable film was manufactured in the same manner as in Example 1, with the exception that the discharge amount, the width of the die from which the polymer was discharged, and the lip gap were adjusted so that the shear rate of the polymer to be discharged was 550 sec$^{-1}$, followed by discharging the polymer, after which the discharged polymer was rapidly cooled and solidified, thus obtaining an unstretched film.

The unstretched film was immediately placed in a tenter, and then subjected to stretching and heat treatment as in Example 1, thus manufacturing a final film. The properties of the film are shown in Table 1 below.

Comparative Example 2

A thermo-shrinkable film was manufactured in the same manner as in Example 1, with the exception that the discharge amount, the width of the die from which the polymer was discharged, and the lip gap were adjusted so that the shear rate of the polymer to be discharged was 96 sec$^{-1}$, followed by discharging the polymer, after which the discharged polymer was rapidly cooled and solidified, thus obtaining an unstretched film. The unstretched film was stretched at (natural stretch ratio+6.5%) in MD and then stretched in TD in a tenter.

Comparative Example 3

A thermo-shrinkable film was manufactured in the same manner as in Example 1, with the exception that the unstretched film was stretched at (natural stretch ratio+0.05%) in MD and then stretched in TD in a tenter.

TABLE 1

| Ex. No. | IV (dl/g) | Melting Peak temp. (°C.) | Thermal Shrinkage (%) MD | Thermal Shrinkage (%) TD | Strength in Direction Perpendicular to Main Shrinking Direction (kg/mm$^2$, Initial Elongation less than 10%) MD | Elongation at Rupture (%) MD | Elongation at Rupture (%) TD | Thick. Uniformity (ΔR) | Rupture Generation (Frequency/ 1000 m) | Printing Uniformity (%) |
|---|---|---|---|---|---|---|---|---|---|---|
| 1 | 0.695 | 196.0 | 2.5 | 65.0 | 4.53 | 120.2 | 95.4 | 2.4 | 0.2 | 98.5 |
| 2 | 0.690 | 202.2 | 4.5 | 63.5 | 5.09 | 315.7 | 78.7 | 2.2 | 0.0 | 98.9 |
| 3 | 0.705 | 197.2 | 2.4 | 65.7 | 5.38 | 650.5 | 85.8 | 1.5 | 0.0 | 99.5 |
| 4 | 0.697 | 194.8 | 3.0 | 77.5 | 5.87 | 450.8 | 65.8 | 1.7 | 0.0 | 99.8 |
| 5 | 0.645 | 192.3 | 2.3 | 64.0 | 3.87 | 68.5 | 83.5 | 2.5 | 0.2 | 98.0 |
| C.1 | 0.690 | 194.0 | 1.5 | 65.2 | 3.14 | 15.5 | 76.5 | 5.5 | 8.0 | 78.5 |
| C.2 | 0.701 | 196.5 | 6.7 | 64.5 | 5.15 | 217.2 | 76.8 | 4.5 | 3.0 | 68.5 |
| C.3 | 0.687 | 194.3 | 1.8 | 64.5 | 3.43 | 49.8 | 75.7 | 2.7 | 4.0 | 88.5 |

As is apparent from Table 1, almost none of the films were ruptured which had the strength of 3.5~6.5 kg/mm$^2$ in a direction perpendicular to a main shrinking direction at an initial elongation less than 10%, the elongation at rupture of 50~700% in a direction perpendicular to a main shrinking direction, the thickness uniformity (ΔR) of 4 or less and the shrinkage ratio of 5% or less in a direction perpendicular to a main shrinking direction. However, in the case where any one of the film properties fell outside of the above range, the rupture generation was considerably high, and thus the process yield during the printing process was reduced, thus lowering the productivity upon preparation of a label. In a final container manufacturing process, the printing uniformity was reduced due to shrinkage non-uniformity, thus increasing defect rates, resulting in reduced production yield.

The invention claimed is:

1. A thermo-shrinkable polyester film, having:
   a strength of 3.5~6.5 kg/mm$^2$ in a direction perpendicular to a main shrinking direction at an initial elongation less than 10%;
   an elongation at rupture of 50~700% in the direction perpendicular to the main shrinking direction;
   a thickness uniformity (ΔR) of 4 or less; and
   a shrinkage ratio of 5% or less in the direction perpendicular to the main shrinking direction.

2. The thermo-shrinkable polyester film according to claim 1, wherein a shrinkage ratio in the main shrinking direction in hot water at 95° C. is 40% or more, and an elongation at rupture in the main shrinking direction is 60~120%.

3. The thermo-shrinkable polyester film according to claim 1, wherein a melting peak temperature is 190~210° C. and an intrinsic viscosity is 0.60~0.72 dl/g.

4. The thermo-shrinkable polyester film according to claim 1, wherein the thermo-shrinkable polyester film comprises at least one copolyester selected from among copolyesters prepared from a dicarboxylic acid component including one or more selected from among dicarboxylic acids including terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and from a diol component including one or more selected from among diols including ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol; or a mixture of homopolyester and copolyester.

5. The thermo-shrinkable polyester film according to claim 4, wherein the copolyester comprises a dicarboxylic acid monomer including 80 mol % or more of a terephthalic acid monomer and a diol monomer including 60 mol % or more of an ethyleneglycol monomer.

6. The thermo-shrinkable polyester film according to claim 4, wherein the copolyester has a glass transition temperature of 67~77° C. and an intrinsic viscosity of 0.60~0.75 dl/g.

7. The thermo-shrinkable polyester film according to claim 4, wherein the homopolyester comprises polybutyleneterephthalate or polytriethylene terephthalate.

8. The thermo-shrinkable polyester film according to claim 7, wherein the polybutyleneterephthalate is used in an amount of 7~15 wt % based on a total amount of the polyester.

* * * * *